United States Patent [19]

Bartholet

[11] Patent Number: 4,502,556

[45] Date of Patent: Mar. 5, 1985

[54] VERTICAL ACTUATOR MECHANISM FOR THE LEGS OF A WALKING MACHINE

[75] Inventor: Stephen J. Bartholet, Orange, Calif.

[73] Assignee: Odetics, Inc., Anaheim, Calif.

[21] Appl. No.: 476,583

[22] Filed: Mar. 18, 1983

[51] Int. Cl.$^3$ ............................................. B62D 57/02
[52] U.S. Cl. .......................................... 180/8.6; 305/3
[58] Field of Search .................... 180/8.6, 8.1, 8.3, 8.4, 180/8.5; 280/1.167; 305/1, 3

[56] References Cited

U.S. PATENT DOCUMENTS

| 3,002,578 | 10/1961 | Kraus ................................... | 180/8.1 |
| 4,202,423 | 5/1980 | Soto ..................................... | 180/8.6 |
| 4,462,476 | 7/1984 | Shkolnik ............................... | 180/8.6 |

FOREIGN PATENT DOCUMENTS 53-36867  5/1978  Japan ..................................... 180/8.1

OTHER PUBLICATIONS

"The Basic Motion Regulation System for a Quadruped Walking Vehicle", by S. Hirose et al., presented at the Design Engineering Technical conference, Sep. 28–Oct. 1, 1980.

Primary Examiner—John A. Pekar
Attorney, Agent, or Firm—Spensley, Horn, Jubas & Lubitz

[57] ABSTRACT

A vertical actuator mechanism for the legs of a walking machine, including four links arranged in a pantograph mechanism, with one corner of the pantograph providing the main mounting point for each leg, which permits the use of swinging links in the vertical actuator mechanism and retains complete isolation between the vertical and horizontal drive mechanisms. Vertical actuation of the pantograph mechanism is accomplished by means of a pair of long, swinging struts connected between a drive nut mounted on a lead screw and a point on the pantograph mechanism. The struts are connected to the pantograph mechanism at a location other than the true pantograph point, the point being selected so that the foot moves approximately linearly as the strut pivots around the drive nut.

8 Claims, 3 Drawing Figures

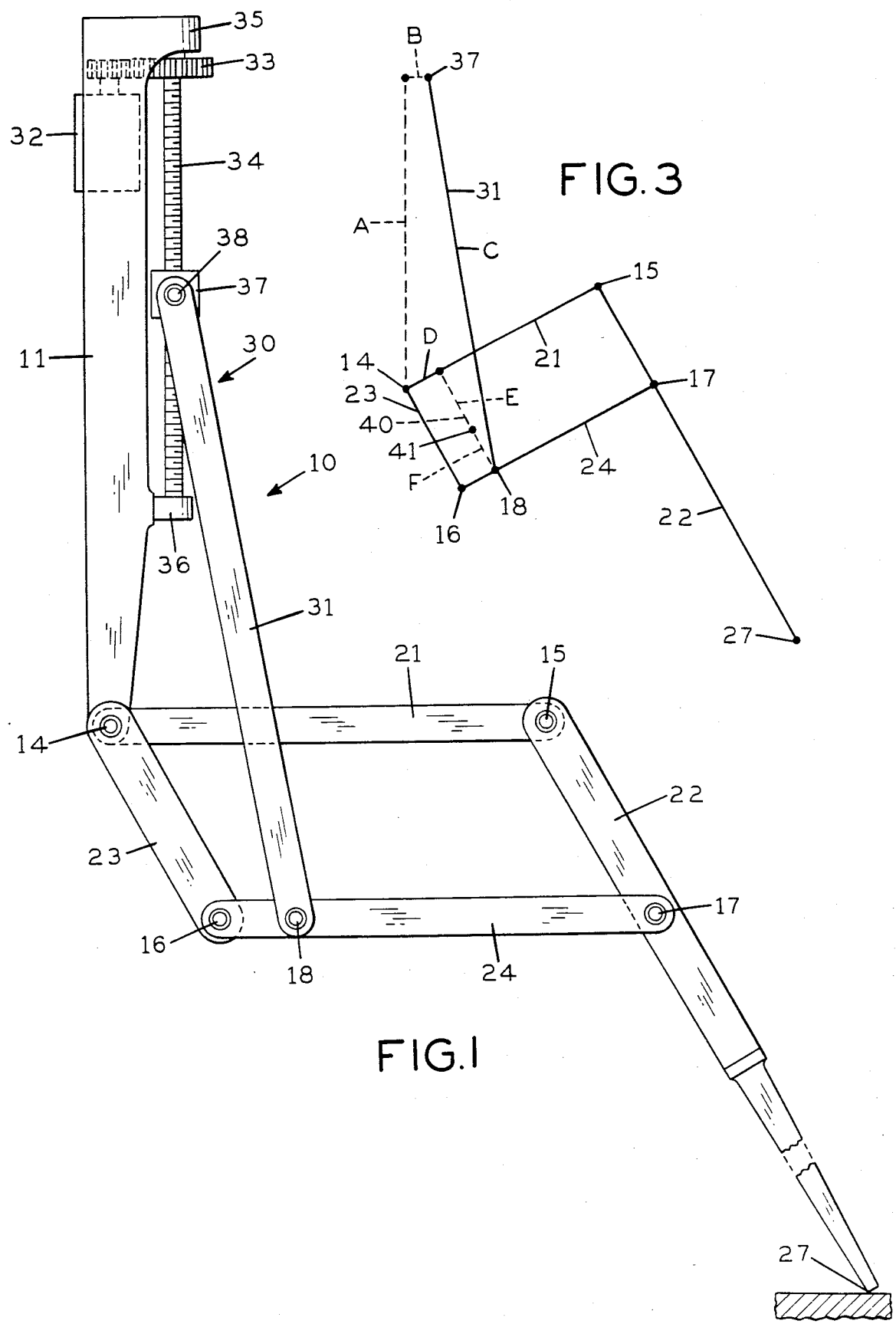

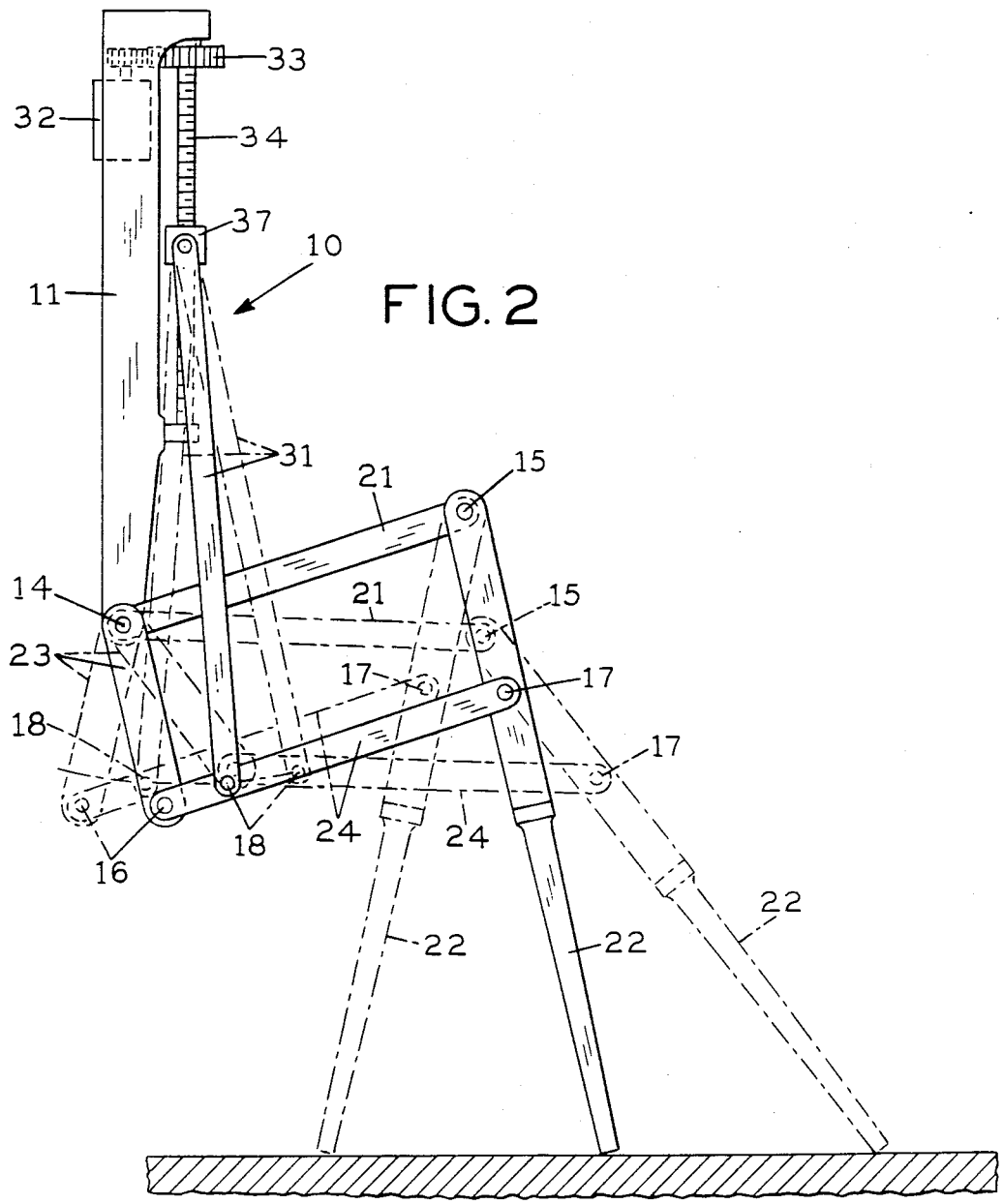

VERTICAL ACTUATOR MECHANISM FOR THE LEGS OF A WALKING MACHINE

BACKGROUND OF THE INVENTION

1. Field of the Invention

The present invention relates to a vertical actuator mechanism for the legs of a walking machine and, more particularly, to a vertical actuator mechanism for a pantograph leg mechanisms for a walking machine which achieves isolation between the vertical and horizontal actuator mechanisms in a simple and efficient manner.

2. Description of the Prior Art

It has long been known that it would be advantageous to develop a machine that walks rather than one driven by wheels or treads because a machine with legs can operate in areas and on terrain where wheeled or treaded vehicles cannot go. Knowing this, numerous attempts have been made over the years to develop a walking machine. However, the problems in developing such a machine have been so formidable that to this time, no satisfactory machine exists. These problems include coordinating the movement of the various legs, teaching the machine how to sense its environment so that each foot lands properly, and teaching the machine balance so that it does not fall over. The simple fact of the matter is that while walking is second nature to people and animals, it is extremely complex for computers and robots.

The computer, with its ability to process enormous amounts of data and actuate suitable commands, promises to make the control of the legs of a walking machine a manageable problem. As a result, a number of researchers around the world have been working on the development of various different types of walking machines.

It is highly desirable to form the leg of a walking machine out of a pantograph mechanism. A pantograph is a parallelogram structure where one corner of the parallelogram is a fixed point, the end of one of the legs of the pantograph is the movable point, the foot, and there exists within the pantograph structure what is known as the true pantograph point, a point which lies on a straight line between the fixed point and the movable point where motion of the true pantograph point in any direction will be translated into a proportional motion of the movable point.

In order to move the foot of the pantograph structure both vertically and horizontally, so that a walking machine to which the leg mechanism is attached can walk, both a vertical actuator mechanism and a horizontal actuator mechanism is required. By using a pantograph mechanism, small motions of the pantograph point can be multiplied at the foot so that compact actuator mechanisms can be used and small movements of these mechanisms can be translated into large movements of the foot.

Another highly desirable objective of a pantograph mechanism is that complete isolation be achieved between the vertical actuator mechanism and the horizontal actuator mechanism. The reason for this is that the vertical actuator mechanism supports the weight of the walking machine and it must, of necessity, be capable of exerting large forces. The horizontal actuator mechanism, on the other hand, is solely responsible for moving the foot horizontally and is not loaded by the weight of the walking machine. Thus, this actuator mechanism can be made small and fast provided that horizontal and vertical foot movements can be isolated and that the walking machine body can be kept level to gravity.

In copending application Ser. No. 476,558, filed concurrently herewith, entitled Leg Mechanism for Walking Machine, and assigned to Odetics, Inc., the assignee of the present application, there is disclosed a foldable pantograph leg mechanism for a walking machine which will allow the legs of a walking machine to fold compactly against the machine body.

In copending application Ser. No. 476,566, filed concurrently herewith, entitled Horizontal Actuator Mechanism for the Legs of a Walking Machine, and assigned to Odetics, Inc., the assignee of the present application, there is disclosed a horizontal actuator mechanism for the pantograph leg mechanism of a walking machine which allows very small motors to be used in applying the horizontal actuation force.

In copending application Ser. No. 476,629, filed concurrently herewith, entitled Walking Machine, and assigned to Odetics, Inc., the assignee of the present application, there is disclosed a walking machine including a body having six legs attached thereto, extending therearound, in uniform positions around the body. As discussed in such application, by arranging a walking machine with a body and six uniformly spaced legs, the machine has the ability to maneuver in areas that are as small as a human being can maneuver in.

Upon review of these applications, the problem remains to drive the pantograph leg mechanism in such a manner that isolation between the horizontal and vertical actuator mechanisms is achieved. The problem with using the true pantograph point as the vertical drive point is that the vertical actuator would have to follow the horizontal movement of the leg. This would mean that the actuator itself would have to slide on rails or in some other way accommodate the horizontal motion of the pantograph point, without changing its relationship to the vertical. Actually, one could either have the vertical actuator slide horizontally on rails to accommodate the horizontal motion of the pantograph point or have the horizontal actuator mechanism slide on rails to accommodate the vertical motion. Either alternative is highly inefficient because of the necessity of providing heavy, bulky mechanisms to support the sliding structure.

It is the desire of the present invention to provide a simple, compact, lightweight mechanism. The ideal type of linkage to transmit large forces with a lightweight, efficient structure is a push-pull link (a strut) where the link is strictly in tension or compression, rather than sliding rails that have to carry high moments. One end of the strut would be connected to a vertical drive mechanism and the other end connected to a point on the pantograph. However, this causes a swinging action of the strut and if connected to the true pantograph point, horizontal movement of the mechanism will cause vertical movement of the connection point, preventing the desired isolation between the horizontal and vertical actuator mechanisms.

SUMMARY OF THE INVENTION

According to the present invention, there is provided a vertical actuator mechanism for the legs of a walking machine, including a plurality of links arranged in a pantograph mechanism, with one corner of the pantograph providing the main mounting point for each leg, which permits the use of swinging links in the vertical actuator mechanism and retains complete isolation between the vertical and horizontal drive mechanisms. Vertical actuation of the pantograph mechanism is accomplished by means of a pair of long, swinging struts connected between a drive nut mounted on a lead screw and a point on the pantograph mechanism. The lead screw and a gear arrangement connecting the lead screw to a motor provides force multiplication so very high forces can be developed in the vertical drive mechanism. These high forces are transmitted to the pantograph mechanism using the tension/compression struts. Finally, the struts are connected to the pantograph mechanism at a location other than the true pantograph point, the point being selected so that it automatically compensates for the foreshortening effect of the swinging strut as the foot moves horizontally.

Briefly, a leg mechanism and actuator therefor constructed in accordance with the teachings of the present invention comprises a frame member, a first elongate link, a first end of the first link being pivotally connected to the frame member, a second link, a first end of the second link being pivotally connected to a second end of the first link, the second end of the second link forming a foot, a third link, a first end of the third link being pivotally connected to the frame member and the first end of the first link, a fourth link, a first end of the fourth link being pivotally connected to the second end of the third link, the second end of the fourth link being pivotally connected to an intermediate point on the second link, drive means connected to the frame member and adapted for linear movement only, and an actuator strut, a first end of the strut being connected to the drive means, a second end of the strut being pivotally connected to an intermediate point on the fourth link, such point on the fourth link being other than the true pantograph point and being selected so that the foot moves approximately linearly as the strut pivots around the first end thereof.

OBJECTS, FEATURES AND ADVANTAGES

It is, therefore, the object of the present invention to solve the problems associated with providing a vertical actuator mechanism for the legs of a walking machine. It is a feature of the present invention to solve these problems by providing a vertical actuator mechanism incorporating a swinging tension/compression strut. An advantage to be derived is complete isolation between the horizontal and vertical forces for driving the leg mechanism. Another advantage is the ability to use a pantograph leg mechanism which multiplies motion of the drive point to the movable point. Still another advantage is the ability to eliminate slidable drive mechanisms.

Still other objects, features and attendant advantages of the present invention will become apparent to those skilled in the art from a reading of the following detailed description of the preferred embodiment constructed in accordance therewith taken in conjunction with the accompanying drawings wherein like numerals designate like parts in the several figures and wherein:

BRIEF DESCRIPTION OF THE DRAWINGS

FIG. 1 is a highly simplified side elevation view of a pantograph leg mechanism for a walking machine incorporating a vertical actuator mechanism constructed in accordance with the present invention;

FIG. 2 is another view of the leg mechanism of FIG. 1 shown in multiple positions thereof; and FIG. 3 is a simplified diagram of FIG. 1, useful in understanding the teachings of the present invention.

DESCRIPTION OF THE PREFERRED EMBODIMENT

Referring now to the drawings and, more particularly to FIG. 1 thereof, there is shown a leg mechanism, generally designated 10, for a walking machine. Reference should be had to the beforementioned copending application Ser. No. 476,558 for a complete description of leg mechanism 10 and the manner in which it will allow the legs of a walking machine to fold compactly against a machine body. Reference should also be had to the beforementioned copending application Ser. No. 476,629 for a more complete description of the manner in which leg mechanism 10 may be combined with a plurality of additional and identical leg mechanisms and attached to a body for forming a complete walking machine. Reference should also be had to the beforementioned copending application Ser. No. 476,566 for a description of a horizontal actuator mechanism for leg mechanism 10.

The construction of a complete walking machine is not directly relevant to the present invention, nor is the exact details of leg mechanism 10, the present invention being only directed to the actuator mechanism for controlling the vertical position of the foot of a pantograph leg mechanism.

Leg mechanism 10 includes an elongate, upright leg frame 11 which is adapted to be connected to a walking machine body (not shown) in a manner (not shown) which will permit pivotal movement of leg frame 11. Leg mechanism 10 includes a plurality of elongate links 21, 22, 23 and 24 arranged in a parallelogram to form a pantograph mechanism whereby forces applied at selected points on individual ones of the links can be transmitted to another link which forms the movable foot of the mechanism. More specifically, a first end of leg 21 and a first end of leg 23 are pivotally connected to the lower end of frame member 11 by means of a pin 14. A first end of link 22 is connected to the second end of link 21 by means of a pin 15. The other end of link 22 forms the foot 27 of leg mechanism 10. A first end of link 24 is pivotally connected to the second end of link 23 by means of a pin 16. The second end of the link 24 is pivotally connected to an intermediate point on link 22 by means of a pin 17. Links 22 and 23 are parallel to each other and links 21 and 24 are parallel to each other.

It will be readily appreciated by those skilled in the art, from an inspection of FIG. 1, that the arrangement of links 21-24 just described forms a pantograph mechanism with the various links formed into a parallelogram, the corners of which are defined by pins 14-17. Pin 14 is the fixed point on the pantograph whereas foot 27 is the ultimate movable member thereof.

According to the present invention, vertical movement of foot 27 is controlled by a vertical actuator mechanism, generally designated 30. Mechanism 30 includes at least one elongate actuator strut 31, a first end of which is pivotally connected to an intermediate point on link 24 by means of a pin 18. Vertical actuator mechanism 30 also includes a motor 32 connected by means of suitable gearing 33 to a lead screw 34 which is mounted for rotation in leg frame 11 by a pair of bearings 35 and 36. A drive nut 37 is mounted on lead screw 34 so that drive nut 37 is driven vertically, either up or down, by rotation of lead screw 34. The second end of strut 31 is pivotally connected to drive nut 37 by means of a pin 38.

It will be immediately apparent from an examination of FIG. 1 that vertical movement of drive nut 37 will be transfered by means of strut 31 to leg mechanism 10 to cause vertical movement of foot 27. It will also be immediately apparent that as foot 27 moves horizontally, pin 18 will move in a circular path, rotating about the fixed point defined by vertical drive nut 37. Thus, if pin 18 connects strut 31 to leg mechanism 10 at the true pantograph point, driving of foot 27 horizontally by the horizontal drive actuator (not shown) would simultaneously cause vertical movement of foot 27, preventing isolation between the horizontal and vertical actuator mechanisms and preventing the horizontal actuator mechanism from being a small, lightweight and simple motor mechanism.

It is the teaching of the present invention to connect the first end of strut 31 to leg mechanism 10 at a point other than the true pantograph point. There is no single, simple, all encompassing way of defining the location of the modified pantograph point because it will depend upon the overall dimensions of vertical actuator strut 31, the location of the vertical actuator mechanism and the dimensions of the links of the pantograph. However, experimentation has shown that a modified pantograph point does exist whereby with vertical drive nut 37 held stationary and foot 27 moved horizontally, foot 27 will move approximately linearly in spite of the foreshortening effect of strut 31. This is shown in FIG. 2 where a first position of leg mechanism 10 is shown in solid lines and multiple other positions thereof are shown in phantom. It is seen that foot 27 moves linearly in spite of the pivotal movement of strut 31.

Experiments have shown that the modified pantograph point will be located in a direction relative to the true pantograph which is parallel to link 22. The modified pantograph point will also be on the opposite side of the true pantograph point from drive nut 37.

Referring now to FIG. 3, there is shown a mathematical analysis of the derivation of the modified pantograph point. Dimension A represents the vertical dimension between mounting point 14 and drive nut 37. This dimension is obviously variable as drive nut 37 moves vertically. Dimension B represents the horizontal offset between pin 14 and drive nut 37. Dimension C represents the length of strut 31. Line 40 is a line parallel to links 22 and 23 which passes through the true pantograph point, designated 41. Dimension D is the distance from fixed pin 14 to the intersection of line 40 with link 21. Dimension E is the distance from link 21 to true pantograph point 41 and dimension F is the distance between true pantograph point 41 and the modified pantograph point, defined by pin 18 which connects strut 31 to link 24. It is seen that modified pantograph point 18 is on line 40 which is parallel to link 22. It is also seen that strut 31 is connected to link 24 below true pantograph point 41. A working embodiment of the present invention has been constructed with the following dimensions:

Links 21 and 24 = 15 inches;
Link 22 = 30 inches;
Link 23 = 7.5 inches;
B = 2.5 inches;
C = 20 inches;
D = 2.5 inches;
E = 5 inches; and
F = 2.5 inches.

For other dimensions of links 21-24, other dimensions will be required as determined by mathematical analysis.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A leg mechanism and actuator therefor comprising:
   a frame member;
   a first elongate link, a first end of said first link being pivotally connected to said frame member;
   a second link, a first end of said second link being pivotally connected to a second end of said first link, the second end of said second link forming a foot;
   a third link, a first end of said third link being pivotally connected to said frame member and said first end of said first link;
   a fourth link, a first end of said fourth link being pivotally connected to the second end of said third link, the second end of said fourth link being pivotally connected to an intermediate point on said second link;
   drive means connected to said frame member and adapted for linear movement only; and
   an actuator strut, a first end of said strut being connected to said drive means, a second end of said strut being pivotally connected to an intermediate point on said fourth link, said point on said fourth link being selected so that said foot moves approximately linearly as said strut pivots around said first end thereof.

2. A leg mechanism and actuator therefor according to claim 1, wherein the direction of linear movement of said foot is perpendicular to the direction of linear movement of said drive means.

3. A leg mechanism and actuator therefor according to claim 2, wherein said frame member is adapted to be positioned vertically, wherein said drive means is adapted for movement in a vertical direction and wherein said point on said fourth link is selected so that said foot moves horizontally as said strut pivots around said first end thereof.

4. A leg mechanism and actuator therefor according to claim 3, wherein said first, second, third and fourth links form a pantograph having a true pantograph point and wherein said intermediate point on said fourth link is located in a direction relative to said true pantograph point which is parallel to said second link.

5. A leg mechanism and actuator therefor according to claim 4, wherein said true pantograph point is positioned between said intermediate point on said fourth link and said first end of said strut.

6. A leg mechanism and actuator therefor according to claim 1, wherein said drive means comprises:
   a lead screw mounted for rotation relative to said leg frame;
   a motor for driving said lead screw; and a drive nut mounted on said lead screw and adapted for linear movement only, said first end of said strut being connected to said drive nut.

7. A leg mechanism and actuator therefor according to claim 1, wherein said first, second, third and fourth links form a pantograph having a true pantograph point and wherein said intermediate point on said fourth link is located in a direction relative to said true pantograph point which is parallel to said second link.

8. A leg mechanism and actuator therefor according to claim 7, wherein said true pantograph point is positioned between said intermediate point on said fourth link and said first end of said strut.

* * * * *